(12) United States Patent
Kempf

(10) Patent No.: US 9,884,526 B2
(45) Date of Patent: Feb. 6, 2018

(54) ELECTRONIC UNIT FOR MEASURING WORKING PARAMETERS OF A VEHICLE WHEEL

(71) Applicants: CONTINENTAL AUTOMOTIVE FRANCE, Toulouse (FR); CONTINENTAL AUTOMOTIVE GmbH, Hannover (DE)

(72) Inventor: Christian Kempf, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 104 days.

(21) Appl. No.: 14/670,556

(22) Filed: Mar. 27, 2015

(65) Prior Publication Data

US 2015/0273957 A1 Oct. 1, 2015

Related U.S. Application Data

(60) Provisional application No. 61/971,623, filed on Mar. 28, 2014.

(30) Foreign Application Priority Data

Mar. 5, 2015 (FR) ...................................... 15 51837

(51) Int. Cl.
*B60C 23/04* (2006.01)
*B60C 29/02* (2006.01)

(52) U.S. Cl.
CPC ...... *B60C 23/0496* (2013.01); *B60C 23/0408* (2013.01); *B60C 23/0491* (2013.01); *B60C 23/0493* (2013.01); *B60C 23/0494* (2013.01); *B60C 29/02* (2013.01)

(58) Field of Classification Search
CPC ............ B60C 23/0408; B60C 23/0496; B60C 23/0494; B60C 29/02; B60C 29/064; B60C 23/0491; B60C 23/0493; B60C 23/0498; B60C 29/06; F16K 15/20; G04C 3/067; H02K 33/00
USPC ............................................ 73/146; 152/427
See application file for complete search history.

(56) References Cited

U.S. PATENT DOCUMENTS

| 7,478,554 B2* | 1/2009 | Roth | .................. B60C 23/0408 73/146 |
| 2004/0163456 A1* | 8/2004 | Saheki | ................ B60C 23/0494 73/146.8 |
| 2008/0100128 A1* | 5/2008 | Parker | .................. B60B 7/0013 301/108.1 |

(Continued)

*Primary Examiner* — Hezron E Williams
*Assistant Examiner* — Gedeon M Kidanu
(74) *Attorney, Agent, or Firm* — Young & Thompson

(57) ABSTRACT

An electronic unit includes an electronic box (1) and a "snap-in" inflation valve (2) made up of a shaft (5) and of an abutment head (6) which are separated by a neck (7) in the shape of an annular groove. The electronic box (1) and the inflation valve (2) are rigidly connected by element, firstly, of an annular piece (22) housed in the neck (7) of the valve body (3), which piece is continued by at least one arm (23) for connecting the annular piece with the electronic box (1), extending externally along the abutment head (6) and in a continuation of the latter, and, secondly, of members (27) for fixing the connecting arm (23) on the electronic box (1).

13 Claims, 2 Drawing Sheets

(56) References Cited

U.S. PATENT DOCUMENTS

| | | | | |
|---|---|---|---|---|
| 2009/0007649 A1* | 1/2009 | Kempf | ............... | B60C 23/0494 |
| | | | | 73/146.8 |
| 2010/0024539 A1* | 2/2010 | Hamm | ............... | B60C 23/0408 |
| | | | | 73/146.5 |
| 2010/0192682 A1* | 8/2010 | Gory | ................. | B60C 23/0494 |
| | | | | 73/146.8 |
| 2010/0326180 A1* | 12/2010 | Nagora | .............. | B60C 23/0494 |
| | | | | 73/146.8 |
| 2011/0209537 A1* | 9/2011 | Zhang | ................ | B60C 23/0408 |
| | | | | 73/146.8 |
| 2011/0248204 A1* | 10/2011 | Palaoro | .............. | B60C 23/0408 |
| | | | | 251/366 |
| 2012/0067482 A1* | 3/2012 | Stech | .................. | B60C 23/003 |
| | | | | 152/415 |
| 2013/0009762 A1* | 1/2013 | Yu | ...................... | B60C 23/0494 |
| | | | | 340/442 |

\* cited by examiner

ELECTRONIC UNIT FOR MEASURING WORKING PARAMETERS OF A VEHICLE WHEEL

FIELD OF THE INVENTION

The invention relates to an electronic unit for measuring working parameters of a vehicle wheel, comprising an electronic box and an inflation valve.

BACKGROUND OF THE INVENTION

More and more motor vehicles have systems for monitoring the pressure of the tires including electronic boxes mounted on each of the wheels of the vehicles, which are dedicated to measuring parameters, such as pressure and/or temperature of the tires provided on these wheels, and intended to inform the driver of any abnormal variation in the measured parameter.

The current solution that is most commonly used to fix the electronic boxes on the rims of the wheels consists in producing electronic units each made up of:
a "snap-in" inflation valve comprising:
  a valve body made from an elastomeric material, provided with a longitudinal axial bore and intended to extend through an opening arranged in the rim, said valve body being made up of an elastically deformable shaft and of a head for abutment against the rim, which head is separated from the shaft by a neck suitable for being positioned in a sealed manner in the opening arranged in said rim,
  and a hollow rigid tube extending in the valve body, continued by an assembling section in a continuation of the abutment head of said valve body,
  said valve body and said rigid tube being designed and assembled such as to permit an elastic deformation of the shaft of the valve body suitable for allowing the inflation valve to be mounted through the opening of the rim,
an electronic box,
and means for rigidly connecting the electronic box on the assembling section of the rigid tube of the inflation valve, in a position of said electronic box where the latter extends in a continuation of said inflation valve.

Based on this principle, a first technique consists in fixing the electronic box, for example by screwing, on the end of the assembling section of the cylindrical tube of the inflation valve. This technique has the advantage of providing a robust assembly, but, by contrast, it requires a space of several millimeters to be arranged between the electronic box and the inflation valve in order to allow the deformations of the latter during mounting of the electronic unit on a wheel rim. Yet, such a distance causes a substantial phenomenon of imbalance which leads to a notable reduction of the dynamic performances of such electronic units.

A second technique consists in producing electronic boxes provided with an assembling sleeve suitable for sliding along the assembling section of the rigid tube of the inflation valve, and in providing each electronic unit with means for rigidly connecting the electronic box and the inflation valve which are suitable for rigidly connecting these, after the inflation valve has been mounted on a rim, in a position of the electronic box where the latter extends in a direct continuation of the inflation valve.

This technique allows the dynamic performances of the electronic units to be increased due to the fact that the electronic boxes are positioned in a direct continuation of the inflation valves. However, currently, the members for rigidly connecting the inflation valve and the electronic box consist of fixing members such as a clip, snap ring, "lyre" spring ring, "O-clamp" crimping clamp, screw clamp, lock plate, etc., which can, with a probability that is not insignificant, be damaged or even unlocked, when putting on and taking off a tire. Moreover, the majority of these fixing members require a specific tool for the installation and the removal thereof, and lead therefore, furthermore, to complicating the steps for mounting and dismounting the electronic units.

SUMMARY OF THE INVENTION

The aim of the present invention is to overcome these disadvantages and the main objective thereof is to provide an electronic unit provided with means for rigidly connecting the electronic box and the inflation valve which cannot be damaged or unlocked when putting on and/or taking off a tire, while being suitable for holding the electronic box in a position where it extends in a direct continuation of the inflation valve.

Another objective of the invention is to provide an electronic unit, the means for rigidly connecting the electronic box and the inflation valve of which are easily accessible and operable by means of a simple standard tool.

To this end, the invention relates to an electronic unit for measuring working parameters of a vehicle wheel, comprising:
an inflation valve suitable for being rigidly connected on a wheel rim, including:
  a valve body made up of a shaft and of an abutment head which are separated by a neck in the shape of an annular groove,
  and a hollow rigid tube extending in the valve body, continued by an assembling section in a continuation of the abutment head of said valve body,
an electronic box provided with an assembling sleeve suitable for housing the assembling section of the rigid tube,
and means for rigidly connecting the electronic box and the inflation valve, in a position of said electronic box where the latter extends in a direct continuation of said inflation valve.

According to the invention, the means for rigidly connecting the electronic box and the inflation valve comprise:
an annular piece housed in the neck of the valve body, which piece is continued by at least one arm for connection between said annular piece and the electronic box, extending externally along the abutment head and in a continuation of said abutment head,
members for fixing the connecting arm on the electronic box.

According to the invention, the means for rigidly connecting the electronic box and the inflation valve therefore comprise an annular piece mounted on the inflation valve by using the capacities for longitudinal and radial elastic deformation of the shaft of said inflation valve, such as to be housed in the annular groove and be positioned between the rim and the abutment head of the inflation valve after the electronic unit has been mounted on said rim.

As a result of the design thereof and of the positioning thereof, such an annular piece continued by the connecting arm thereof, firstly, does not incur any risk of damage or unlocking when a tire is being put on and/or taken off, and secondly, leads to the electronic box being held in a position where it extends in a direct continuation of the inflation valve.

Moreover, the fixing members are suitable for fixing the connecting arm on the electronic box and, firstly, are therefore easily accessible, and, secondly, can consist of fixing members of any normal type which can be operated by means of a standard tool.

As an advantageous embodiment, these fixing members can, therefore, consist of a threaded pin rigidly connected by screwing in an opening arranged in the connecting arm and a blind bore arranged in the electronic box.

According to an advantageous embodiment of the invention, the annular piece has an internal diameter that is substantially less than the diameter of the bottom of the annular groove, such as to be anchored in said groove bottom.

This arrangement allows the active resistance surface of the annular piece to be increased without, however, the risk of interfering with the seal provided by anchoring, to a substantial depth, the rim in the annular groove at the opening of said rim wherein the inflation valve is housed.

Moreover, the annular piece has an external diameter paired with the diameter of the abutment head, which diameter is suitable such that said annular piece is flush with the peripheral face of the abutment head, such as to optimize the active resistance surface of the annular piece without creating areas that can be caught when putting on or taking off a tire.

With the same aim of producing an annular piece which does not have projecting areas which can be caught by a tire, the annular piece is, according to the invention, advantageously orientated such that the connecting arm extends laterally with respect to the hollow rigid tube, such as to be rigidly connected to a lateral wall of the electronic box.

Moreover, according to another advantageous embodiment of the invention, the annular piece is continued by a second arm for connecting with the electronic box, extending externally along the abutment head, said connecting arm and the electronic box being provided with complementary members for assembly by interlocking.

This second connecting arm forms a second point for anchoring the annular piece with the electronic box which allows the forces to which said annular piece is subjected to be balanced.

Moreover, to optimize this balancing of the forces urging the annular piece, the two connecting arms, for rigidly connecting the electronic box and the inflation valve, and for assembly by interlocking, respectively, are, advantageously according to the invention, diametrically opposite.

Moreover, still with the aim of producing an annular piece which does not have projecting areas that can be caught by a tire, the abutment head of the inflation valve includes a peripheral wall wherein, according to the invention, for each connecting arm, a longitudinal channel is advantageously arranged, that is suitable for housing the section of said connecting arm extending along the abutment head.

BRIEF DESCRIPTION OF THE DRAWINGS

Other features, aims and advantages of the invention will emerge from the detailed following description with reference to the appended drawings which show a preferential embodiment thereof by way of nonlimiting example. In these drawings.

DETAILED DESCRIPTION OF THE INVENTION

Figure 1:
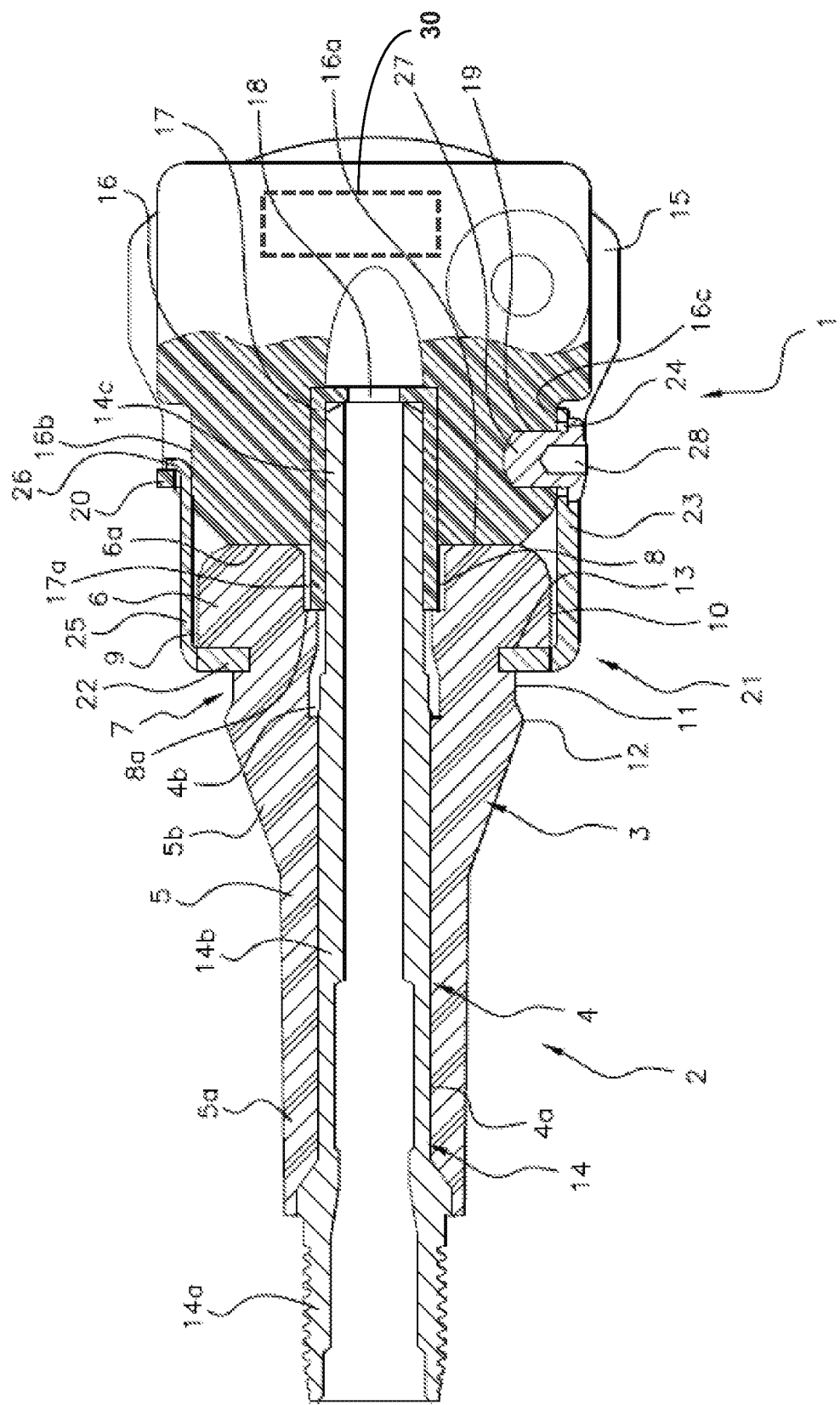
FIG. 1 is a longitudinal section according to an axial plane A of FIG. 2, showing an electronic unit in accordance with the invention.
Figure 2:
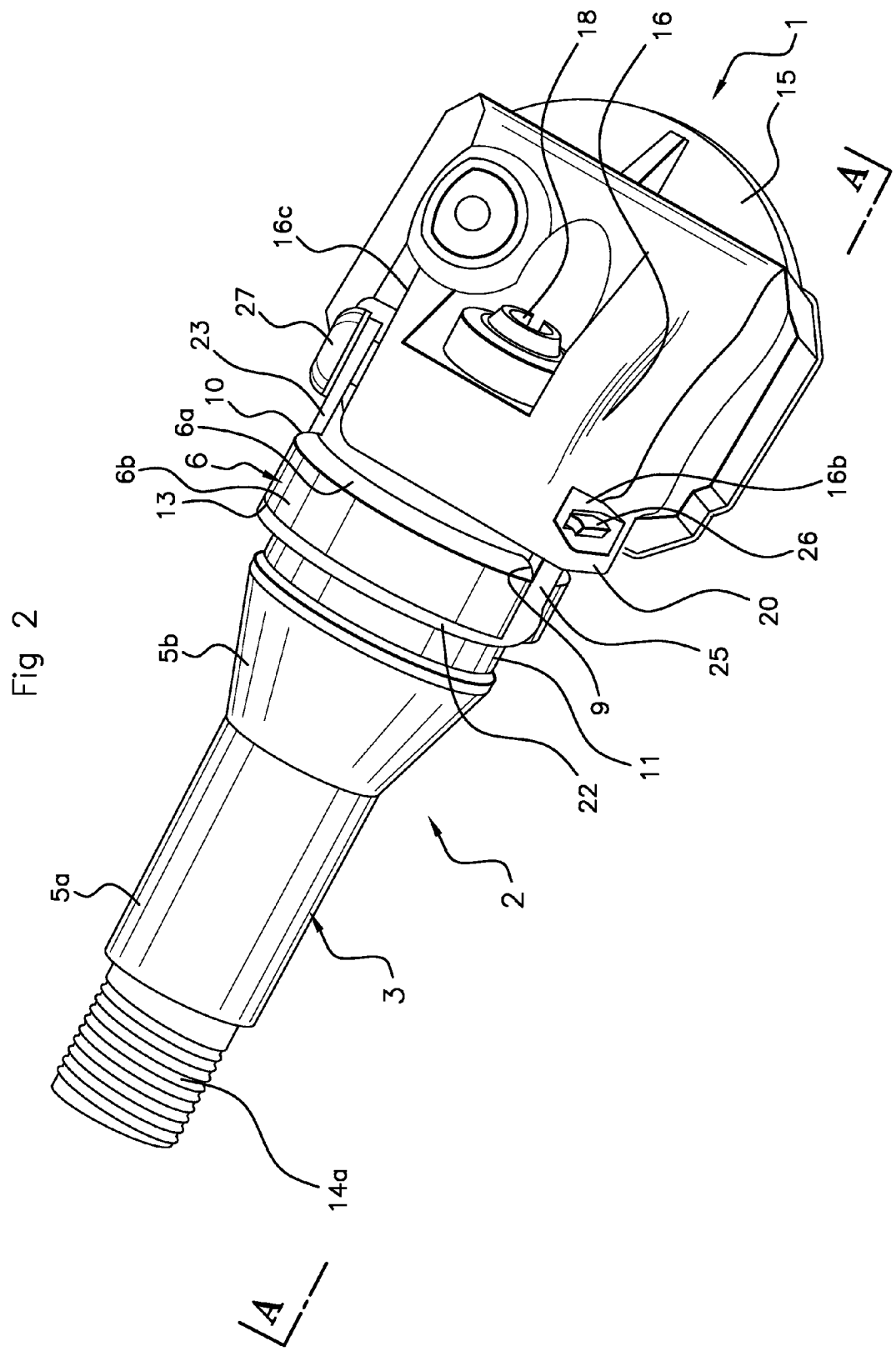
FIG. 2 is a perspective view of this electronic unit.

The electronic unit according to the invention shown by way of example in FIGS. 1 and 2 is intended to be mounted on a wheel of a vehicle for the measurement of working parameters (pressure, temperature, acceleration, etc.) of said wheel, and for the transmission of the measured data to a central unit mounted on the vehicle.

This electronic unit is made up of an electronic box 1 suitable to be mounted inside the casing of a tire, and of an inflation valve 2, for rigidly connecting the latter on the rim of the wheel provided with this tire.

Firstly, the inflation valve 2 consists of a "snap-in" inflation valve including a valve body 3 made from an elastomeric material that axially has a cylindrical longitudinal bore 4 therethrough.

Conventionally, this valve body 3 is subdivided, furthermore, longitudinally, into a shaft 5 having capacities for longitudinal and radial elastic deformation, and into an abutment head 6 defined by an abutment end face 6*a* and a peripheral annular face 6*b*, said shaft 5 and abutment head 6 being separated by a neck 7 having the shape of an annular groove provided with a cylindrical bottom wall 11, and defined by two shoulders: a shoulder 12 for joining with the shaft 5, and a radial shoulder 13 for joining with the abutment head 6.

Moreover, the abutment head 6 includes two diametrically opposite longitudinal channels 9, 10 arranged in the peripheral wall 6*b* thereof.

The longitudinal bore 4 of the valve body 3 includes a first section 4*a* extending inside the shaft 5, and a second section 4*b* extending from the neck 7, with a diameter greater than that of the first section 4*a*. The second section 4*b* is, furthermore, continued by a cylindrical chamber 8 of greater diameter, which chamber is separated from said second section by a radial shoulder 8*a*, and opens onto the end wall 6*a* of the abutment head 6.

The inflation valve 2 further includes a hollow tubular core consisting of a rigid tube 14 with an external diameter paired with the internal diameter of the first section 4*a* of the bore 4, the central section 14*b*, housed in the valve body 2, of which is continued by:
a threaded section 14*a* intended for the screwing of a protective cap, in a continuation of the shaft 5 of the valve body 2,
a section 14*c* having the same diameter in a continuation of the abutment head 6.

The electronic box 1 of the electronic unit is made up of a hollow box 15 intended to house "the electronics" 30 of the electronic unit, which box is surmounted by a dome 16 defined by an end wall 16*a* for abutment with the end wall 6*a* of the abutment head 6, and by two longitudinal lateral walls 16*b*, 16*c*.

Furthermore, this dome 16 has a sleeve 17 passing longitudinally therethrough, which sleeve is arranged such as to partially extend in a continuation of the abutment face 16*a* of said dome, and including an end opening 18 at the opposite end thereof for the flow of air for deflating or inflating the tire.

Furthermore, this sleeve 17 has an internal diameter and a length which are suitable for housing the section 14*c* of the cylindrical tube 14, and for abutting against the shoulder 8*a* of the cylindrical chamber 8, in a position where the abutment face 6a of the abutment head 6 and the abutment head 16a of the dome 16 are in contact with one another.

The dome 16 includes, moreover, a blind bore 19 arranged in one of the two lateral walls 16c thereof, and a keep 20 in the form of an arch projecting with respect to the second lateral wall 16b thereof.

The means of rigidly connecting the electronic box 1 and the inflation valve 2 comprise a connecting piece 21 made up in one piece of:

an annular piece 22 with an internal diameter that is substantially less than the diameter of the groove bottom 11, which is suitable such that said annular piece is anchored in said groove bottom, and with an external diameter paired with the diameter of the abutment head 6, two diametrically opposite connecting arms 23, 25 extending externally along the abutment head 6, each in one of the channels 9, 10, and in a continuation of said abutment head in the direction of the electronic box 1.

One of these two connecting arms 23, which is intended to be rigidly connected to the electronic box 1, has a tapped opening 24 therethrough which is suitable for being positioned opposite the bore 19 arranged in the lateral face 16c of the dome 16, such as to allow said connecting piece to be rigidly connected to the electronic box 1 by means of a pin 27 paired with the bore 19, provided with a threaded section for the screwing thereof into the opening 24, the end face of which has an impression 28 therethrough for a screwing tool.

The other connecting arm 25, intended to be assembled by interlocking with the electronic box 1, includes a hook-shaped end 26 suitable for interlocking with the keep 20.

In order to produce an electronic unit in accordance with the invention, a first operation consists in mounting the connecting piece 21 on the valve body 2 by using the capacities for longitudinal and radial elastic deformation of the shaft 5 of said inflation valve, such as to bring the annular piece 22 to be housed in the annular groove forming the neck 7.

By way of example, for an inflation valve 2, the groove bottom 11 of which has a diameter of approximately 15 mm, which valve is intended to be mounted on a rim, the opening for mounting said inflation valve of which has a diameter of approximately 11 mm to 12 mm, the selected internal diameter of the annular piece 22 is approximately 13 mm for anchoring the annular piece 22 in the groove bottom 11, without however interfering with the seal provided by anchoring, to a greater depth, the rim in said groove bottom.

Once this mounting has been carried out, the production of the electronic unit simply requires:

assembling the inflation valve 2 and the electronic box 1 by fitting the end section 14c of the cylindrical tube 14 into the sleeve 17, and interlocking the hook of the connecting arm 25 with the keep 20, then locking this assembly by screwing the pin 27.

The electronic unit obtained has the advantage of being formed from an inflation valve 2 and an electronic box 1 held in a position where it extends in a direct continuation of said inflation valve, by rigid connection means which cannot be damaged or unlocked when putting on and/or taking off a tire, while being suitable for holding the electronic box in a position where it extends in a direct continuation of the inflation valve.

Moreover, these rigid connection means consist of a simple pin 27 that is easily accessible and can be operated by screwing.

The invention claimed is:

1. An electronic unit for measuring working parameters of a vehicle wheel, comprising:
    an inflation valve adapted for being rigidly connected on a wheel rim, including:
        a valve body made up of a shaft and of an abutment head which are separated by a neck in the shape of an annular groove, and
        a hollow rigid tube extending in the valve body, continued by an assembling section in a continuation of the abutment head of said valve body,
    an electronic box provided with an assembling sleeve for housing the assembling section of the rigid tube,
    and a connector rigidly connecting the electronic box and the inflation valve, in a position of said electronic box where the latter extends in a direct continuation of said inflation valve,
wherein the connector connecting the electronic box and the inflation valve comprises:
    an annular piece housed in the neck of the valve body, the annular piece is continued by at least one arm for connection between said annular piece and the electronic box, extending externally along the abutment head and in a continuation of said abutment head, and members fixing the connecting arm on the electronic box.

2. The electronic unit as claimed in claim 1, wherein the annular piece has an external diameter paired with the diameter of the abutment head, which diameter is suitable such that said annular piece is flush with the peripheral face of the abutment head.

3. The electronic unit as claimed in claim 1, wherein the electronic box has a blind bore therethrough arranged opposite an opening arranged in the connecting arm, the fixing members comprising a threaded pin housed in said opening and bore, for rigid connection by screwing of the connecting arm on the electronic box.

4. The electronic unit as claimed in claim 1, wherein the annular piece is orientated such that the connecting arm extends laterally with respect to the hollow rigid tube, such as to be rigidly connected to a lateral wall of the electronic box.

5. The electronic unit as claimed in claim 1, wherein the abutment head of the inflation valve includes a peripheral wall wherein, for each connecting arm, a longitudinal channel is arranged, that is suitable for housing the section of said connecting arm extending along the abutment head.

6. The electronic unit as claimed in claim 1, wherein the annular piece is continued by a second arm for connecting with the electronic box, extending externally along the abutment head, said connecting arm and the electronic box being provided with complementary members for assembly by interlocking.

7. The electronic unit as claimed in claim 6, comprising two diametrically opposite connecting arms, for rigidly connecting the electronic box and the inflation valve, and for assembly by interlocking, respectively.

8. The electronic unit as claimed in claim 1, wherein the annular piece has an internal diameter that is substantially less than the diameter of the bottom of the annular groove, such as to be anchored in said groove bottom.

9. The electronic unit as claimed in claim 8, wherein the annular piece has an external diameter paired with the diameter of the abutment head, which diameter is suitable such that said annular piece is flush with the peripheral face of the abutment head.

10. The electronic unit as claimed in claim 8, wherein the electronic box has a blind bore therethrough arranged opposite an opening arranged in the connecting arm, the fixing members comprising a threaded pin housed in said opening and bore, for rigid connection by screwing of the connecting arm on the electronic box.

11. The electronic unit as claimed in claim 8, wherein the annular piece is orientated such that the connecting arm extends laterally with respect to the hollow rigid tube, such as to be rigidly connected to a lateral wall of the electronic box.

12. The electronic unit as claimed in claim 8, wherein the annular piece is continued by a second arm for connecting with the electronic box, extending externally along the abutment head, said connecting arm and the electronic box being provided with complementary members for assembly by interlocking.

13. The electronic unit as claimed in claim 8, wherein the abutment head of the inflation valve includes a peripheral wall wherein, for each connecting arm, a longitudinal channel is arranged, that is suitable for housing the section of said connecting arm extending along the abutment head.

\* \* \* \* \*